US008631461B2

(12) United States Patent
Dixon

(10) Patent No.: US 8,631,461 B2
(45) Date of Patent: *Jan. 14, 2014

(54) DYNAMIC DATA-PROTECTION POLICIES WITHIN A REQUEST-REPLY MESSAGE QUEUING ENVIRONMENT

(75) Inventor: Bret W. Dixon, South Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,888

(22) Filed: Mar. 29, 2012

(65) Prior Publication Data

US 2013/0013924 A1    Jan. 10, 2013

Related U.S. Application Data

(63) Continuation of application No. 13/177,252, filed on Jul. 6, 2011.

(51) Int. Cl.
*H04L 29/06* (2006.01)
*H04L 9/00* (2006.01)
*G06F 15/16* (2006.01)

(52) U.S. Cl.
USPC .................................. 726/1; 726/4; 713/150

(58) Field of Classification Search
None
See application file for complete search history.

(56) References Cited

U.S. PATENT DOCUMENTS

| 7,188,219 | B2 | 3/2007 | Jeddeloh | |
|---|---|---|---|---|
| 7,237,260 | B2 | 6/2007 | Yu et al. | |
| 7,339,942 | B2 * | 3/2008 | Morgan et al. | 370/412 |
| 8,081,569 | B2 * | 12/2011 | Kourkouzelis et al. | 370/230 |
| 2003/0018760 | A1 | 1/2003 | Putzolu et al. | |
| 2003/0076849 | A1 | 4/2003 | Morgan et al. | |
| 2003/0079144 | A1 * | 4/2003 | Kakemizu et al. | 713/200 |
| 2004/0049574 | A1 | 3/2004 | Watson et al. | |
| 2005/0080838 | A1 | 4/2005 | Colby et al. | |
| 2007/0179802 | A1 | 8/2007 | Buss et al. | |
| 2008/0155437 | A1 | 6/2008 | Morris | |
| 2009/0006606 | A1 * | 1/2009 | Lubbers et al. | 709/224 |
| 2009/0006741 | A1 * | 1/2009 | Lubbers et al. | 711/114 |

(Continued)

FOREIGN PATENT DOCUMENTS

WO      03094019 A1    11/2003

OTHER PUBLICATIONS

United States Patent and Trademark Office, Office Action for U.S. Appl. No. 13/177,252, Dec. 28, 2012, pp. 1-11, Alexandria, VA, USA.

(Continued)

*Primary Examiner* — Christopher Revak
(74) *Attorney, Agent, or Firm* — Lee Law, PLLC; Christopher B. Lee

(57) ABSTRACT

A request to process a request message using a request queue within a request-reply messaging environment is detected at a dynamic data protection module. At least one authorized sender module and a sole authorized recipient module of a response message to the request message is identified using a request queue policy of the request queue. A reply queue policy is dynamically created to process the response message using the identified at least one authorized sender module and the sole authorized recipient module of the response message. The dynamically-created reply queue policy is associated with a reply queue. The response message is processed responsive to a request to process the response message using the dynamically-created reply queue policy and the associated reply queue.

8 Claims, 6 Drawing Sheets

(56) References Cited

U.S. PATENT DOCUMENTS

| | | | |
|---|---|---|---|
| 2009/0041013 A1 | 2/2009 | Mitchell et al. | |
| 2009/0222823 A1 | 9/2009 | Parkinson et al. | |
| 2009/0241118 A1 | 9/2009 | Lingamneni | |
| 2010/0112983 A1* | 5/2010 | Walker et al. | 455/411 |
| 2010/0115581 A1* | 5/2010 | Goldschlag et al. | 726/1 |
| 2010/0115582 A1* | 5/2010 | Sapp et al. | 726/1 |
| 2010/0180349 A1* | 7/2010 | Koohgoli et al. | 726/30 |
| 2010/0235887 A1* | 9/2010 | Burch et al. | 726/4 |
| 2011/0225294 A1* | 9/2011 | Chase et al. | 709/224 |
| 2011/0225394 A1 | 9/2011 | Mital et al. | |
| 2012/0096175 A1* | 4/2012 | Kourkouzelis et al. | 709/228 |
| 2013/0013920 A1* | 1/2013 | Dixon | 713/168 |

OTHER PUBLICATIONS

PCT International Searching Authority, International Search Report and Written Opinion for PCT Application No. PCT/IB2012/052982, Nov. 8, 2012, pp. 1-10, Alexandria, VA, USA.

United States Patent and Trademark Office, Notice of Allowance for U.S. Appl. No. 13/177,252, May 29, 2013, pp. 1-15, Alexandria, VA, USA.

* cited by examiner

DYNAMIC DATA-PROTECTION POLICIES WITHIN A REQUEST-REPLY MESSAGE QUEUING ENVIRONMENT

RELATED APPLICATIONS

This application is a continuation of and claims priority to and claims the benefit of U.S. patent application Ser. No. 13/177,252 titled "DYNAMIC DATA-PROTECTION POLICIES WITHIN A REQUEST-REPLY MESSAGE QUEUING ENVIRONMENT," which was filed in the United States Patent and Trademark Office on Jul. 6, 2011, and which is incorporated herein by reference in its entirety.

BACKGROUND

The present invention relates to request-reply messaging environments. More particularly, the present invention relates to dynamic data-protection policies within a request-reply message queuing environment.

In message queuing technology, application programs may store and retrieve data in the form of messages via message queues using an application program interface (API). Message queues allow buffering of messages so that application programs may retrieve messages asynchronously with respect to message reception via the message queues. Message queues may be sized according to an anticipated number of messages that may be accumulated within a message queue prior to retrieval of the messages by the respective application programs.

BRIEF SUMMARY

A method includes detecting, at a dynamic data protection module, a request to process a request message via a request queue within a request-reply messaging environment; identifying at least one authorized sender module and a sole authorized recipient module of a response message to the request message using a request queue policy of the request queue; dynamically creating a reply queue policy to process the response message using the identified at least one authorized sender module and the sole authorized recipient module of the response message; associating the dynamically-created reply queue policy with a reply queue; and processing the response message responsive to a request to process the response message using the dynamically-created reply queue policy and the associated reply queue.

A system includes a communication module and a processor programmed to detect a request to process a request message via a request queue within a request-reply messaging environment; identify at least one authorized sender module and a sole authorized recipient module of a response message to the request message using a request queue policy of the request queue; dynamically create a reply queue policy to process the response message using the identified at least one authorized sender module and the sole authorized recipient module of the response message; associate the dynamically-created reply queue policy with a reply queue; and process the response message responsive to a request to process the response message using the dynamically-created reply queue policy and the associated reply queue.

A computer program product includes a computer readable storage medium including computer readable program code, where the computer readable program code when executed on a computer causes the computer to detect a request to process a request message via a request queue within a request-reply messaging environment; identify at least one authorized sender module and a sole authorized recipient module of a response message to the request message using a request queue policy of the request queue; dynamically create a reply queue policy to process the response message using the identified at least one authorized sender module and the sole authorized recipient module of the response message; associate the dynamically-created reply queue policy with a reply queue; and process the response message responsive to a request to process the response message using the dynamically-created reply queue policy and the associated reply queue.

DETAILED DESCRIPTION

Figure 1:
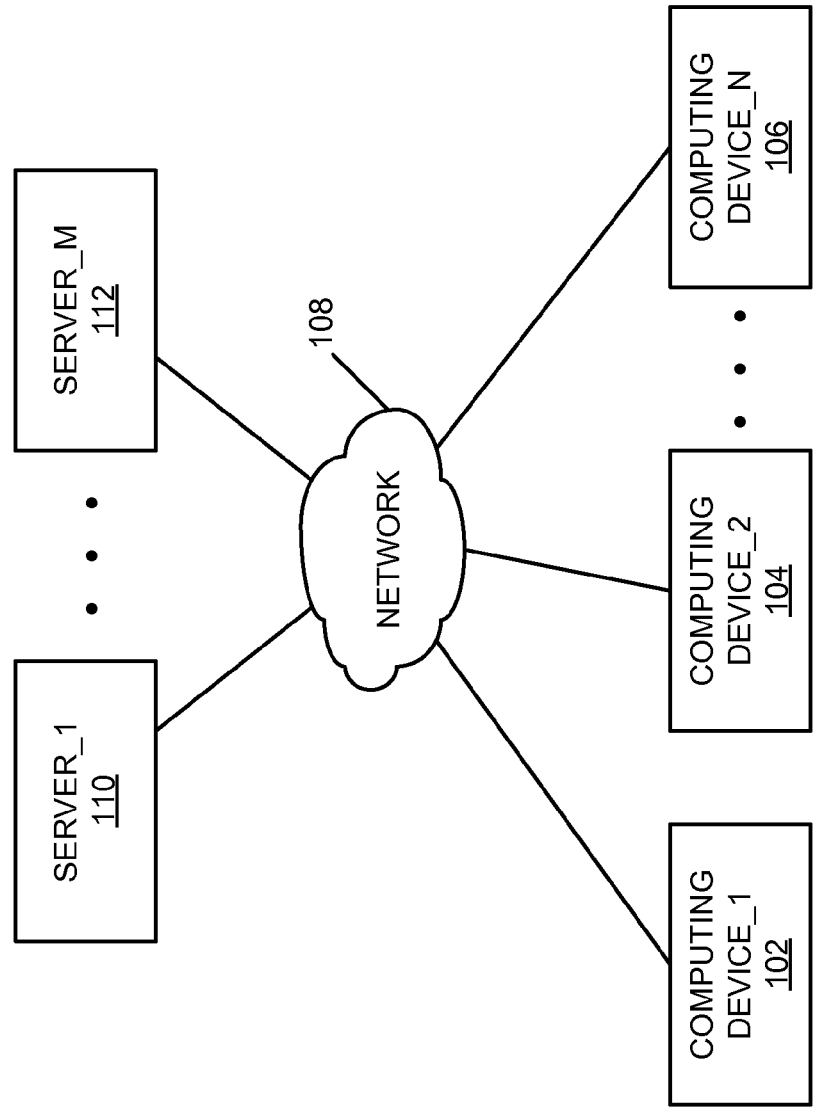
FIG. 1 is a block diagram of an example of an implementation of a system for automated dynamic data-protection policies within a request-reply message queuing environment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides dynamic data-protection policies within a request-reply message queuing environment. A dynamic data protection module detects a request to process a request message via a request queue within a request-reply messaging environment. The request to process the request message may include a "PUT" message request for a request message received from a requester module or a "GET" message request for the request message received from a responder module that intends to process the request. At least one authorized sender module and a sole authorized recipient module of a reply message to the request message are identified using a request queue policy of the request queue. A reply queue policy is dynamically created to process the reply message using the identified at least one authorized sender module and the authorized sole recipient module of the reply message. For example, sender and recipient data fields of the request queue policy may be swapped to create the respective sender and recipient data fields of the dynamically-created reply queue policy (e.g., the Sender field of the request policy becomes the sole entry of the Recipient field of the dynamically-created reply policy and the Recipient field entry/entries of the request policy become the entry/entries for the Sender field of the dynamically-created reply policy). The dynamically-created reply queue policy is associated with a reply queue and the reply message is processed responsive to a request to process the reply message using the dynamically-created reply queue policy and the associated reply queue.

As such, data-protection policies for reply queues are dynamically created based upon a request queue policy of the request queue and content of the request message retrieved from the request queue. For purposes of the present description, if encryption is to be used for a reply message, the content of the request message will include the encryption information (e.g., encryption key/certificate) of the requester module when the request message is "put" to the request queue, and the encryption information of the requester module will be added to the dynamically-created reply queue, at least on the responder side, in response to a "get" request associated with the request message. However, it should be noted that the encryption information of the requester module may be added to the dynamically-created reply queue on the requester side without departure from the scope of the present subject matter. As described above, the present subject matter leverages the fact that the request queue policy identifies user devices that may "put" messages to the request queue (e.g., senders/requesters), and user devices that may "get" messages from the request queue (e.g., recipients/responders). Because the request queue policy information provides information to allow messages to be encrypted for specific recipients and for recipients to optionally verify the authenticity of senders, this request queue policy information is utilized to dynamically create reply queues and reply queue policies in real time in response to retrieval of request messages. All recipients identified in the request queue policy are registered as potential senders in the dynamically-generated reply queue policy. The sender of the request message is identified as the sole recipient in the dynamically-generated reply queue policy. As such, the original requester now has a dedicated dynamically-generated data-protection policy for the reply queue that allows any of the potential responders to place a message on the reply queue, with any such reply message protected for the specific user device that issued the original request message. If an encryption algorithm is to be used for encryption of a reply message, the encryption algorithm (e.g., encryption information or an encryption key) may be retrieved from a separate and/or external service that stores encryption keys/certificates. It should be noted, however, that regardless of whether reply messages are encrypted, dynamic generation of reply queue policies allows for run-time management of reply messages without requiring advanced provisioning of reply queue policies in association with responder modules. It should further be noted that the same dynamic reply queue policy may be used on both the requester side and responder side of a messaging interaction if both the requester-side dynamic data protection module and the responder-side dynamic data protection module are running on the same host. However, it is noted that where the respective dynamic data protection modules operate on different hosts, there may be two matching policies, one used by the responder-side dynamic data protection module to "put" the reply message to the reply queue, and the other used by the requester-side dynamic data protection module to "get" the reply message from the reply queue.

For purposes of the present description, "policies" may be considered forms of configurations (e.g., data items, files, metadata, etc.) that identify the specific user or users that may exchange encrypted messages via specific message queues. Policies may also stipulate relevant encryption algorithms to use for messages directed to the respective specific user or users. As described in more detail below, "dynamic reply queue policies" may be created along with dynamic reply queues in response to request messages using information within the request message and a request message policy associated with the request queue from which the request message was retrieved. Additionally, it should be noted that the present description utilizes the phrases "dynamic reply queue" and "reply queue" interchangeably for convenience. However, it should be understood that a reply queue utilized for a particular request-reply messaging interaction may be either dynamically created for use during the particular request-reply messaging interaction or the reply queue may be selected from an existing pool of reply queues and may be assigned to the particular request-reply messaging interaction as appropriate for a given implementation. As such, the term "dynamic reply queue" may refer to either a dynamically-created reply queue or may refer to a dynamically-assigned/selected reply queue as appropriate for the given implementation.

Additionally, encryption may be of any form or algorithm appropriate for a given implementation. It is understood that many forms of encryption are available and that any encryption may be used as appropriate for a given implementation. For example, Public Key Infrastructure (PKI) techniques, which involve digital certificates and public and private certificate keys, may be used. Further, an encryption algorithm may be specified within a request message to request encryption of the response message according to a specified encryption algorithm. Encryption algorithms such as triple data encryption algorithm (Triple DES), variations of the advanced encryption standard (AES) such as AES 128 (one hundred and twenty-eight bit), AES 192 (one hundred and ninety-two bit), AES 256 (two hundred and fifty-six bit), Rivest cipher (RC2), RC4, RC5, RC6, and other forms of encryption may be used without departure from the scope of the present subject matter.

To eliminate the need for all potential requester certificates to be pre-configured for availability to responders, the request message includes the requester's public key or certificate within its message content. Responder may extract the public key of the requester from the request message and then use it to generate the protected reply.

As described above, the sender of the request message is identified as the sole recipient in the dynamically-generated reply queue policy. However, it should be noted that in certain implementations a request queue policy may list multiple potential senders. Within any such implementation, the sender of the specific request message may be identified by examining the content of the specific request message and/or examining the user (e.g., user identifier (ID)) associated with issuance of the request message to facilitate dynamic generation of a data-protection policy for a dynamically-generated/ assigned reply queue such that any reply message may be protected for the specific user device that issued the original request message.

It should be noted that the present subject matter may be flexibly implemented within a variety of systems and, as such, may be considered platform independent. For example, the present subject matter may be implemented within mainframe systems, within distributed system, within client-server systems, or within standalone systems without departure from the scope of the present subject matter.

As such, request queues and reply queues may be associated with each device that interacts within a request-reply messaging environment. In any such implementation, the dynamic generation of reply queue policies provides for creation of the reply queue policies in real time under circumstances where the intended reply queue is not known at the time of issuance of the request message (e.g., either the reply queue is also dynamically generated or is specified/assigned during run time, such as from a pool of available queues, responsive to a request message). Further, the dynamic generation of reply queue policies provides for creation of the reply queue policies in real time under circumstances where the intended reply queue is known at the time of issuance of the request message.

A data-protection service intercepts requests to "put" and "get" messages to request and reply queues, and applies the data-protection policies as described above and in more detail below. Regarding dynamic policy generation, policies for reply queues may be dynamically generated in response to detections of requests to "put" messages to request queues and in response to detections of requests to retrieve (e.g., "get") messages from request queues. Authorized recipients of request messages may be determined using the request queue policy associated with the particular request message, by identifying a user associated with the request to process a request message, or by examining the content of the request message, as appropriate for the given implementation.

Regarding dynamic policy generation for reply queues in response to requests to "PUT" messages to request queues (e.g., from a requester side), the data-protection service/module detects when an application issues a request to place a request message on a request queue and generates a dynamic data-protection reply queue policy for that specific message, and subsequent reply messages to the same reply queue. To do this, the data-protection service is enhanced to detect that a request to "PUT" a request message onto a request queue has occurred. The data-protection service identifies the intended reply queue for the reply message to be issued responsive to the request message. The data-protection service creates a dynamic data-protection policy based upon the reply queue name to associate the dynamically-created reply queue policy with the reply queue (again, it should be noted that the reply queue may also be dynamically created), the recipients of the request message identified in the request queue policy become the authorized senders in the dynamic reply queue policy, the sender of the request message identified in the request queue policy becomes the sole recipient in the dynamic reply queue policy, and any algorithmic specification in the request queue policy may be copied to the dynamic reply queue policy for data protection purposes (e.g., encryption). The public key or certificate of the sender may be included by the requester-side dynamic data protection service within the request message (e.g., as part of the content and/or payload) and may be incorporated into the dynamic reply queue policy created from the request message on the responder side of the messaging interaction. The dynamic data protection module on the responder side may encrypt reply messages for the specific requester module using the public key or certificate stored within the dynamically-created reply queue policy on the responder side of the messaging interaction. Additionally, as described above, the public key or certificate may optionally be retrieved from an encryption key service (accessible by the requester-side dynamic data protection module) that stores the encryption information of the requester module or the encryption information may be added to the dynamically created reply queue policy on the requester side of a messaging interaction, as appropriate for a given implementation. As such, the public key or certificate may optionally be added to the dynamically created reply queue policy on the requester side of a messaging interaction without departure from the scope of the present subject matter. As such, the data-protection service on the requester side of a messaging transaction may decrypt response message for the requester module using the encryption key identified either via the encryption key service or via the encryption information stored within the dynamically-created reply queue policy on the requester side of the messaging interaction.

Regarding dynamic policy generation for reply queues in response to requests to "GET" messages from request queues (e.g., from a responder side), the data-protection service/module detects when an application issues a request to retrieve a request message from a request queue and generates a dynamic data-protection reply queue policy for that specific message, and subsequent request messages that identify the same reply queue. To do this, the data-protection service is enhanced to detect that a request to "GET" a request message from a request queue has occurred. The data-protection service identifies the intended reply queue for the reply message to be issued responsive to the request message. The data-protection service creates a dynamic data-protection policy based upon the reply queue name to associate the dynamically-created reply queue policy with the reply queue (again, it should be noted that the reply queue may also be dynamically created), the recipients of the request message identified in the request queue policy become the authorized senders in the dynamic reply queue policy, the sender of the request message identified in the request queue policy (or identified within the content of the request message) becomes the sole recipient in the dynamic reply queue policy (it should be noted that on the request retrieval side, the sender may be determined by extracting user detail/information from the request message content). However, it should be noted that on the responder side, any algorithmic specification may be identified within the request message rather than the request queue policy and the algorithmic specification may be copied to the dynamic reply queue policy for data protection purposes (e.g., encryption). As such, the public key or certificate of the sender in the request message may be incorporated into the dynamic reply queue policy and does not need to be provisioned on the responder side prior to receipt of the request message. As such, the responder-side data-protection service may encrypt reply messages for the specific requester prior to passing the reply message to the queue manager or prior to placing messages on the reply queue, as appropriate for the particular implementation.

The present subject matter provides an expansion of the data-protection paradigm as it relates to request-reply message queuing scenarios and enhancing data-protection services by dynamically generating data-protection policies for reply queues (dynamically created or otherwise) based on request queue policy details and request message content. The present subject matter further expands the data-protection paradigm by allowing public key details to be extracted from request message content and used for generating reply messages to that specific request message, thereby eliminating the need for requester public key or certificate data to be pre-configured for use by message responder devices.

It should be noted that while the present examples utilize dynamic creation of the actual reply queues, the dynamic reply queue policy creation described herein may be utilized with statically-created reply queues without departure from the scope of the present subject matter.

It should be noted that conception of the present subject matter resulted from recognition of certain limitations associated with dynamic message queue processing in association with data protection. For example, dynamic queues may have dynamically-generated names when they are created. Data protection policies cannot be predefined specifically for message queues where the reply queue name is not known in advance because there is no reply queue name to which to bind the data protection policy. As such, data protection policies could not previously be used for such dynamically-created reply queues. The present subject matter improves data-protection within request-reply message queue environments by allowing dynamic reply queue policy creation in response to received request messages, as described above and in more detail below. As such, improved dynamic message queue processing and data protection may be obtained through dynamic creation of policies for reply queues, which may additionally include dynamic creation of reply message queues. Further, digital certificates of requester devices need not be configured in advance of messaging, thereby reducing configuration complexity within request-reply message queue environments.

The dynamic data-protection policies within a request-reply message queuing environment described herein may be performed in real time to allow prompt creation of data-protection capable reply message queues within a request-reply message queuing environment. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

It should further be noted that there are several possible physical implementations of the present subject matter and that the examples herein provide detail for implementation in association with specific architectural domains. However, many other possible variations on architecture for implementation of the present subject matter are possible and all are considered within the scope of the present subject matter.

FIG. 1 is a block diagram of an example of an implementation of a system 100 for automated dynamic data-protection policies within a request-reply message queuing environment. A computing device_1 102, a computing device_2 104, through a computing device_N 106 communicate via a network 108 with a server_1 110 through a server_M 112. It should be noted that the configuration of FIG. 1 is one possible example of an implementation and, as described above, many variations of system implementations are possible. However, for purposes of clarity with respect to the present example, any device within the system 100 may operate locally or remotely with respect to any other device. Further, when running locally there is no cross-network involved between the respective local devices.

As will be described in more detail below in association with FIG. 2 through FIG. 5B, the computing device_1 102 through the computing device_N 106 and the server_1 110 through the server_M 112 may provide automated dynamic data-protection policies within a request-reply message queuing environment, as appropriate for a given implementation. As such, multiple devices may collaboratively provide automated dynamic data-protection policies within a request-reply message queuing environment or a single device may provide automated dynamic data-protection policies within a request-reply message queuing environment.

The automated dynamic data-protection policies within a request-reply message queuing environment are facilitated by a data protection service/module that interfaces between a requester device/application and a responder device/application. A queue manager application may also process queue management functionality at the direction of the data protection service/module. For purposes of brevity within the present description, the data protection service/module may be referred to herein as a data protection module. It is understood that one or more data protection modules may be utilized to implement the present subject matter as appropriate for a given implementation. Similarly, for brevity herein the requester device/module/application and a responder device/module/application may be referred to as a requester module and a responder module, though it is understood that one or more requester applications or responder applications may be associated with any particular device. It is further understood that where a requester module or a responder module are implemented other than completely in hardware, the respective application may be an application executed by one or more processors, as described in more detail below.

The automated dynamic data-protection policies within a request-reply message queuing environment facilitates policy creation for response/reply queues that are dynamically created or assigned in response to request message initiation or receipt of a request message. Regarding dynamic response queue policy creation responsive to request message initiation, a "put" request for a request message initiated by a requester module may be intercepted by the data protection module for a requester application and a dynamic reply queue policy may be created based upon the content of the request message or the request queue policy (or a combination), as appropriate for a given implementation. Conversely, with respect to dynamic response queue policy creation responsive to receipt of a request message, a "get" request for a request message from a responder module may be intercepted by the data protection module for a responder application and a dynamic reply queue policy may be created based upon the content of the request message or the request queue policy (or a combination), again as appropriate for a given implementation.

It should be noted that the computing device_1 102 through the computing device_N 106, and/or the server_1 110 through the server_M 112, may be a portable computing device, either by a user's ability to move the respective device to different locations, or by the respective device's association with a portable platform, such as a plane, train, automobile, or other moving vehicle. It should also be noted that the computing device_1 102 through the computing device_N 106 and the server_1 110 through the server_M 112 may be any computing device capable of processing information as described above and in more detail below. For example, any of the respective computing devices may include devices such as a mainframe computer, a distributed computing device within a distributed network of computing devices, a personal computer (e.g., desktop, laptop, etc.) or a handheld device (e.g., cellular telephone, personal digital assistant (PDA), email device, music recording or playback device, etc.), or any other device capable of processing information as described in more detail below.

The network 108 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 110 through the server_M 112 may include any device capable of providing data for consumption by a device, such as the computing device_1 102 through the computing device_N 106, via a network, such as the network 108. For example, the server_1 110 through the server_M 112 may each represent a web server, an application server, or other data server device, as appropriate for a given implementation.

Figure 2:
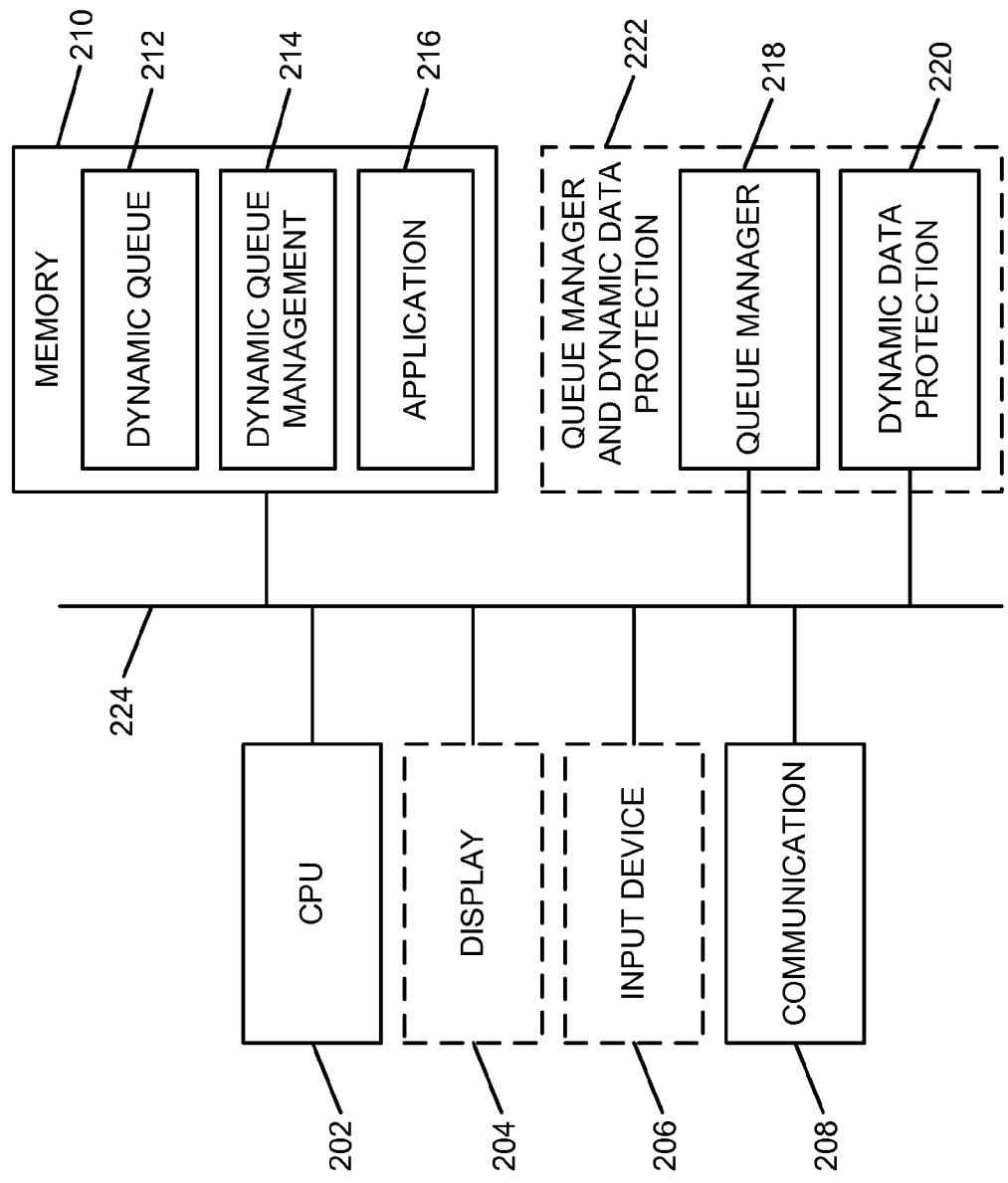
FIG. 2 is a block diagram of an example of an implementation of a core processing module capable of performing automated dynamic data-protection policies within a request-reply message queuing environment according to an embodiment of the present subject matter.

FIG. 2 is a block diagram of an example of an implementation of a core processing module 200 capable of performing automated dynamic data-protection policies within a request-reply message queuing environment. The core processing module 200 may be associated with any of the computing device_1 102 through the computing device_N 106 and/or any of the server_1 110 through the server_M 112, as appropriate for a given implementation. Further, the core processing module 200 may provide different and complementary processing for creation of dynamic reply queue policies for dynamically assigned and/or created reply queues in association with each implementation, as described in more detail below. The core processing module 200 is capable of performing automated dynamic data-protection policies within a request-reply message queuing environment. A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100, such as the computing device_1 102 through the computing device_N 106 and the server_1 110 through the server device_M 112, to perform the automated dynamic data-protection policies within a request-reply message queuing environment described herein. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a dynamic queue storage area 212, a dynamic queue management storage area 214, and an application area 216. The dynamic queue storage area 212 stores queues that may include one or more request queues and one or more dynamically-assigned or dynamically-created reply queues, as described above and in more detail below. However, it should be noted that the memory 210 represents a general implementation of a storage device and that any suitable device capable of storing the data described herein may be used, such as for example a hard disk or other device, as described in more detail below. The dynamic queue management storage area 214 stores information, such as dynamic reply queue policies created in response to request messages and other information as appropriate for a given implementation. The application area 216 represents storage and execution space for one or more applications, such as one or more requester applications and/or one or more responder applications.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A queue manager module 218 provides queue management processing for the core processing module 200, such as placement of messages onto and retrieval of messages from queues stored within the dynamic queue storage area 212, as described above and in more detail below. A dynamic data protection module 220 is also shown. The dynamic data protection module 220 implements the automated dynamic data-protection policies within a request-reply message queuing environment of the core processing module 200. The dynamic data protection module 220 intercepts messaging, such as request messages, from one or more requester applications that may be executing locally within the application area 216 or remotely at another device. The dynamic data protection module 220 creates dynamic reply queue policies for use to deliver response messages directly to sending devices in a secure manner. The dynamic data protection module 220 creates dynamic reply queue policies based upon the content of the particular request message(s) and the particular sender and intended recipients/responders, and a request queue policy, as also described in more detail below.

It is additionally noted that a queue manager and dynamic data protection module 222 is illustrated via a dashed-line representation within FIG. 2. The queue manager and dynamic data protection module 222 is shown to include both the queue manager module 218 and the dynamic data protection module 220, and is illustrated by the dashed-line representation to indicate that the queue manager module 218 and the dynamic data protection module 220 may be implemented within a single module as appropriate for the given implementation.

Though the queue manager module 218 and the dynamic data protection module 220 (and also the queue manager and dynamic data protection module 222) are illustrated as a component-level module for ease of illustration and description purposes, it should be noted that the respective modules may include any hardware, programmed processor(s), and memory used to carry out the respective functions of these modules as described above and in more detail below. For example, these modules may include additional controller circuitry in the form of application specific integrated circuits (ASICs), processors, and/or discrete integrated circuits and components for performing communication and electrical control activities associated with the respective devices. Additionally, these modules may include interrupt-level, stack-level, and application-level modules as appropriate. Furthermore, these modules may include any memory components used for storage, execution, and data processing for performing processing activities associated with the respective modules.

It should also be noted that the queue manager module 218 and the dynamic data protection module 220 (and also the queue manager and dynamic data protection module 222) may form a portion of other circuitry described without departure from the scope of the present subject matter. Further, these modules may alternatively be implemented as an application stored within the memory 210. In such an implementation, these modules may include instructions executed by the CPU 202 for performing the functionality described herein. The CPU 202 may execute these instructions to provide the processing capabilities described above and in more detail below for the core processing module 200. These modules may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, the queue manager module 218, the dynamic data protection module 220, and the queue manager and dynamic data protection module 222 are interconnected via an interconnection 224. The interconnection 224 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
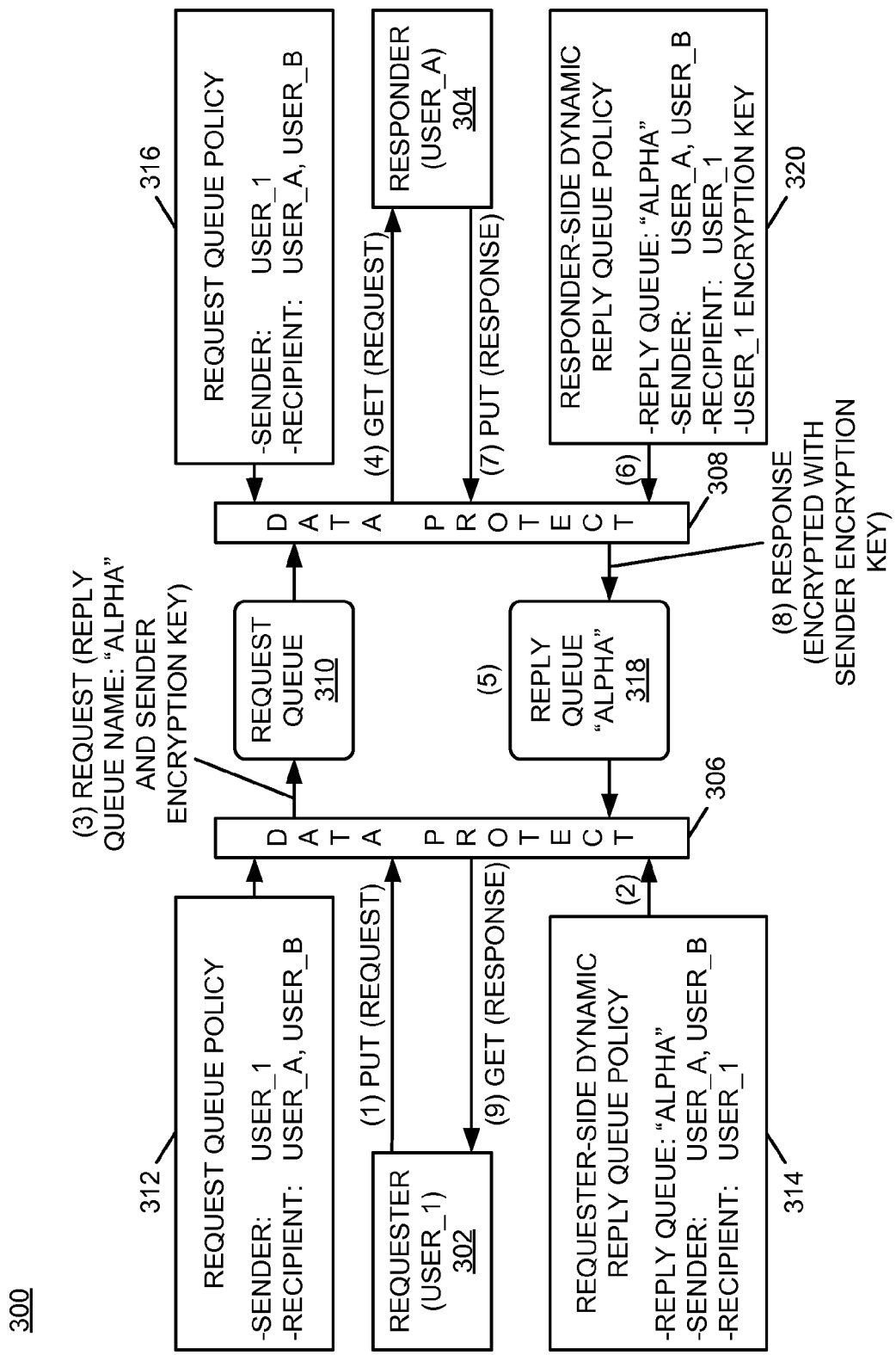
FIG. 3 is a logical block diagram of an example of an implementation of a messaging interaction that illustrates dynamic reply queue policy creation based upon a request queue policy from a perspective of both a requester and a responder according to an embodiment of the present subject matter.

FIG. 3 is a logical block diagram of an example of an implementation a messaging interaction 300 that illustrates dynamic reply queue policy creation based upon a request queue policy from a perspective of both a requester and a responder. As a logical block diagram, details of the mapping of the respective components of FIG. 3 onto the example architecture of the core processing module 200 of FIG. 2 may be understood by review of the details of the core processing module 200 described above. These details are omitted from FIG. 3 to eliminate crowding within the drawing content of FIG. 3. Further, separate queue manager modules, such as the queue manager 218 are omitted also to avoid crowding within the drawing content of FIG. 3. However, it is understood that a queue manager module functions to process message placement to and retrieval from queues, and that queues may be stored, for example, within one or more dynamic queue storage areas such as the dynamic queue storage area 212 described above. Additionally, data protection modules, such as the dynamic data protection module 220, may be implemented as one or more dynamic data protection modules. Policies, including request queue policies and dynamically-created reply queue policies may be stored, for example, within one or more dynamic queue management storage areas such as the dynamic queue management storage area 214. For any implementation including more than one of any such component, the multiple components may be implemented within one or more devices, and as such, within one or more core processing modules 200. In view of the significant number of variations in implementation, details of the mapping of the components of FIG. 3 to any specific architecture are omitted herein for brevity and may vary based upon the description herein as appropriate for any given implementation.

Referring to FIG. 3, a Requester (USER_1) 302 interacts with a Responder (USER_A) 304 in a request-reply operation within a dynamic reply queue policy messaging implementation. A dynamic data protection module 306 protects data and message for the Requester (USER_1) 302 by encrypting messaging sent from the Requester (USER_1) 302 and decrypting messaging received by the Requester (USER_1) 302. Additionally, the dynamic data protection module 306 creates dynamic reply queue policies for the Requester (USER_1) 302, as described in more detail below.

A dynamic data protection module 308 protects messages for the Responder (USER_A) 304 by decrypting messaging received by the Responder (USER_A) 304 and encrypting messaging sent from the Responder (USER_A) 304. Additionally, the dynamic data protection module 308 creates dynamic reply queue policies for the Responder (USER_A) 304, as described in more detail below.

The logical flow of the messaging interaction 300 begins with the Requester (USER_1) 302 initiating a "put" for a request message at logical flow point (1) within FIG. 3 (e.g., "(1) PUT (REQUEST)"). The request message includes a static request queue name for a Request Queue 310. The Request Queue 310 has an associated Request Queue Policy 312 on the requester side of the messaging interaction. The Request Queue Policy 312 identifies the sender of the request message as "USER_1," which represents the Requester (USER_1) 302, and lists potential responders as "USER_A,"

which represents the Responder (USER_A) 304, and "USER_B," which is a device/application not shown within FIG. 3 due to crowding within the drawing content. As such, the Responder (USER_A) 304 is a potential recipient and, in this example, a responder to the request message. It should be noted that the identity of the sender may be identified by examining the operating system assigned user identifier (ID) associated with the requester application. As such, it may or may not be available within and to be extracted from the Request Queue Policy 312. Additionally, the Request Queue Policy 312 may have more than one valid sender. In such a situation, the associated user ID associated with the requester application may be used to determine which of the authorized requester applications has issued the particular request message.

In response to the "put" request for the request message at logical flow point (1) within FIG. 3 (e.g., "(1) PUT (REQUEST)") by the Requester (USER_A) 302, the dynamic data protection module 306 analyzes the request message and the Request Queue Policy 312 to determine an appropriate dynamic reply queue policy to create. The dynamic data protection module 306 assigns a reply queue name of "ALPHA" for the reply queue to be created or assigned for the reply message and identifies an encryption key of the Requester (USER_1) 302. It should be noted that the reply queue name is provided in the request message. As such, the requester application may either request that the queue manager (or a combined dynamic data protection module and queue manager module) create a reply queue prior to messaging interactions. During request message creation, the requester module may add that name to the request message. Alternatively, the requester module may use a predefined reply queue name in the request message. Other possibilities exist for naming reply queues and all are considered within the scope of the present subject matter.

The dynamic data protection module 306 creates a requester-side Dynamic Reply Queue Policy 314 at logical flow point (2) within FIG. 3. The requester-side Dynamic Reply Queue Policy 314 includes the intended reply queue name "ALPHA" for the reply queue to be created or assigned for the reply message, the authorized senders of a reply message (e.g., USER_A and USER_B), and the recipient of the reply message "USER_1," which represents the Requester (USER_1) 302.

It should be noted that the dynamic data protection module 306 may swap the "SENDER" and "RECIPIENT" fields of the Request Queue Policy 312 (e.g., USER_1 and USER_A, USER_B, respectively) to form the "SENDER" and "RECIPIENT" fields of the requester-side Dynamic Reply Queue Policy 314 (e.g., USER_A, USER_B and USER_1, respectively). As such, the information used to create the sender and recipient fields of the requester-side Dynamic Reply Queue Policy 314 may be obtained from the existing Request Queue Policy 312.

It should be noted that the reply queue name "ALPHA" has been added to the request message by the Requester (USER_1) 302. The dynamic data protection module 306 retrieves the encryption keys for the recipients/responders identified within the Request Queue Policy 312 (e.g., USER_A and USER_B). As described above, retrieval of encryption keys may be performed via a request to an external service that stores encryption keys/certificates. However, it should be noted that the encryption keys need not be a part of the Request Queue Policy 312 (though they may optionally be included), and that the names of the recipients are part of the Request Queue Policy 312 and these names are used to get the appropriate keys/certificates for any listed recipients.

Requester applications/modules may be configured to "know" the names of the request queues that they choose to use to which to "put" request messages. The requester applications/modules tell the respective queue manager to "put" a request message to a particular request queue and the responder applications/modules tell the respective queue manager to "put" the response message to the respective reply queue. The queue manager places the request message on the designated request queue and the reply message on the designated reply queue. The dynamic data protection module 306 (and 308) sits between the respective requester or responder applications, respectively, and the queue manager so that the dynamic data protection module 306 (and 308) may intercept these requests. This allows the dynamic data protection module 306 (and 308) to encrypt and decrypt "on the fly" during run time. The requester application may request the queue manager to "invent" a reply queue name, or use a specific name, as appropriate for the given implementation. When the "invented" name approach is used, the queue manager tells the application the name it "invented." The requester application subsequently uses this name when it gets reply messages. The dynamic data protection module 306 encrypts the request message payload for each authorized responder using the respective recipient encryption key of the respective authorized responders. The dynamic data protection module 306 submits the request message to the queue manager (not shown within FIG. 3) for placement on the Request Queue 310. The queue manager places the modified request message on the Request Queue 310 at logical flow point (3) within FIG. 3 (e.g., (3) REQUEST (REPLY QUEUE NAME: "ALPHA" AND SENDER ENCRYPTION KEY)).

As such, the request message now includes the name of the intended reply queue to be created or assigned for the response message and includes the encryption key of the specific sender of the message. Accordingly, a response message generated by any of the intended responders (e.g., USER_A and USER_B) may be encrypted for the specific requesting device, which is the Requester (USER_1) 302 within the present example.

As described above, it is understood that many forms of encryption are available and that any encryption may be used as appropriate for a given implementation. For example, Public Key Infrastructure (PKI) techniques, which involve digital certificates and public and private certificate keys, may be used. Further, an encryption algorithm may be specified within a request message, or the algorithm may form part of the request queue policy and optionally be copied to the dynamically-created reply queue policy, to request encryption of the response message according to a specified encryption algorithm. Encryption algorithms such as triple data encryption algorithm (Triple DES), variations of the advanced encryption standard (AES) such as AES 128 (one hundred and twenty-eight bit), AES 192 (one hundred and ninety-two bit), AES 256 (two hundred and fifty-six bit), Rivest cipher (RC2), RC4, RC5, RC6, and other forms of encryption may be used without departure from the scope of the present subject matter.

The Request Queue 310 also has an associated Request Queue Policy 316 on the responder side of the messaging interaction. It should be noted that if the requester and responder are executing on the same host, the Request Queue Policy 312 and the Request Queue Policy 316 may be the same policy. Similar to the Request Queue Policy 312, the Request Queue Policy 316 identifies the sender of the request message as "USER_1," which represents the Requester (USER_1) 302, and lists potential responders as "USER_A," which represents the Responder (USER_A) 304, and "USER_B," which is a device/application not shown within FIG. 3 due to crowding within the drawing content. As such, the Request Queue Policy 316 also identifies the Responder (USER_A) 304 as a potential recipient and, in this example, a responder to the request message.

In response to the "get" request for the request message at logical flow point (4) within FIG. 3 (e.g., "(4) GET (REQUEST)") by the Responder (USER_A) 304, the dynamic data protection module 308 analyzes the request message and the Request Queue Policy 316 to determine an appropriate dynamic reply queue policy to create. The dynamic data protection module 308 assigns a reply queue name from the request message (e.g., "ALPHA") for the reply queue to be created or assigned for the reply message and identifies an encryption key of the Requester (USER_1) 302 within the request message. The dynamic data protection module 308 instructs the queue manager (not shown) to create a queue with the name "ALPHA," and a Reply Queue "ALPHA" 318 is created or assigned for the anticipated reply message at logical flow point (5) within FIG. 3. For purposes of the present description, the Reply Queue "ALPHA" 318 may be considered a dynamic reply queue in that it may be either dynamically created or dynamically assigned from a pool of available queues for use in association with the anticipated reply message.

Similar to the requester-side processing to create the requester-side Dynamic Reply Queue Policy 314, the dynamic data protection module 308 creates a responder-side Dynamic Reply Queue Policy 320 at logical flow point (6) within FIG. 3. It should be noted that if requester and responder are operating on the same host, the requester-side Dynamic Reply Queue Policy 314 and the responder-side Dynamic Reply Queue Policy 320 may be the same policy. In such an implementation, instead of creating a responder-side policy, the single dynamic reply queue policy may be updated with the additional sender key information. The responder-side Dynamic Reply Queue Policy 320 includes the reply queue name "ALPHA" for the reply queue that was created or assigned for the reply message, the authorized senders of a reply message (e.g., USER_A and USER_B), the recipient of the reply message "USER_1," which represents the Requester (USER_1) 302, and the encryption key of the Requester (USER_1) 302 included within the request message.

It should be noted that the dynamic data protection module 308 may swap the "SENDER" and "RECIPIENT" fields of the Request Queue Policy 316 (e.g., USER_1 and USER_A, USER_B, respectively) to form the "SENDER" and "RECIPIENT" fields of the responder-side Dynamic Reply Queue Policy 320 (e.g., USER_A, USER_B and USER_1, respectively). As such, the information used to create the sender and recipient fields of the responder-side Dynamic Reply Queue Policy 320 may be obtained from the existing Request Queue Policy 316.

The dynamic data protection module 308 identifies a decryption key for the Responder (USER_A) 304 within the Request Queue Policy 316 and decrypts the request message payload encrypted for this particular authorized responder using the identified encryption key of the Responder (USER_A) 304. As described above, the decryption key may be obtained by a service that stores encryption keys using a user ID of the responder module. Alternatively, the encryption information may be stored within the respective request queue policies as appropriate for a given implementation. The dynamic data protection module 308 provides the decrypted message to the Responder (USER_A) 304 for processing.

In response to completion of processing the request message, the Responder (USER_A) 304 initiates a "put" request for a response message at logical flow point (7) within FIG. 3 (e.g., "(7) PUT (RESPONSE)"). The dynamic data protection module 308 analyzes the responder-side Dynamic Reply Queue Policy 320 to identify the intended recipient of the response message (e.g., Requester (USER_1) 302), the encryption key of the intended recipient, and the Reply Queue "ALPHA" 318 created for this particular messaging interaction.

The dynamic data protection module 308 also verifies that the Responder (USER_A) 304 is an authorized responder to the request message. If the Responder (USER_A) 304 is an authorized responder to the request message, the dynamic data protection module 308 encrypts the response message for the Requester (USER_1) 302 and submits the encrypted response message for placement on the Reply Queue "ALPHA" 318 to the queue manager (not shown) at logical flow point (8) within FIG. 3 (e.g., (8) RESPONSE (ENCRYPTED WITH SENDER ENCRYPTION KEY)).

In response to the "get" request for the response message at logical flow point (9) within FIG. 3 (e.g., "(9) GET (RESPONSE)") by the Requester (USER_1) 302, the dynamic data protection module 306 analyzes the requester-side Dynamic Reply Queue Policy 314 to identify all authorized responders to the original request message. The dynamic data protection module 306 also identifies the encryption key of the original requester (e.g., the Requester (USER_1) 302). The dynamic data protection module 306 may have access to the requester encryption information either within the request message itself or may have access to the requester encryption information separate from the request message itself. The dynamic data protection module 306 determines whether the responder is an authorized responder and listed within the requester-side Dynamic Reply Queue Policy 314. If the responder is listed as an authorized responder, the dynamic data protection module 306 decrypts the response message for the Requester (USER_1) 302 using the encryption key of the original requester and provides the response message to the Requester (USER_1) 302.

It should be noted that the requester-side Dynamic Reply Queue Policy 314 and the responder-side Dynamic Reply Queue Policy 320 may be deleted upon completion of the messaging interaction and memory may be returned for use by other applications/processing and or messaging purposes. Further, the Reply Queue "ALPHA" 318 may be deleted or returned to a pool of available queues, as appropriate for a given implementation.

As such, the dynamic data protection module 306 and the dynamic data protection module 308 each provide for dynamic reply queue policy creation in response to request messages. As described above, reply queues may be dynamically created or assigned/named from a pool of available queues for processing reply messages based upon the reply messages. Further, encryption keys may be forwarded with request messages, reply messages may be encrypted for specific requesting entities dynamically, and responders do not need to be provisioned with encryption keys for all possible requesters. As such, the dynamic data protection module 306 and the dynamic data protection module 308 each provide automated dynamic data-protection policies within a request-reply message queuing environment.

Figure 4:
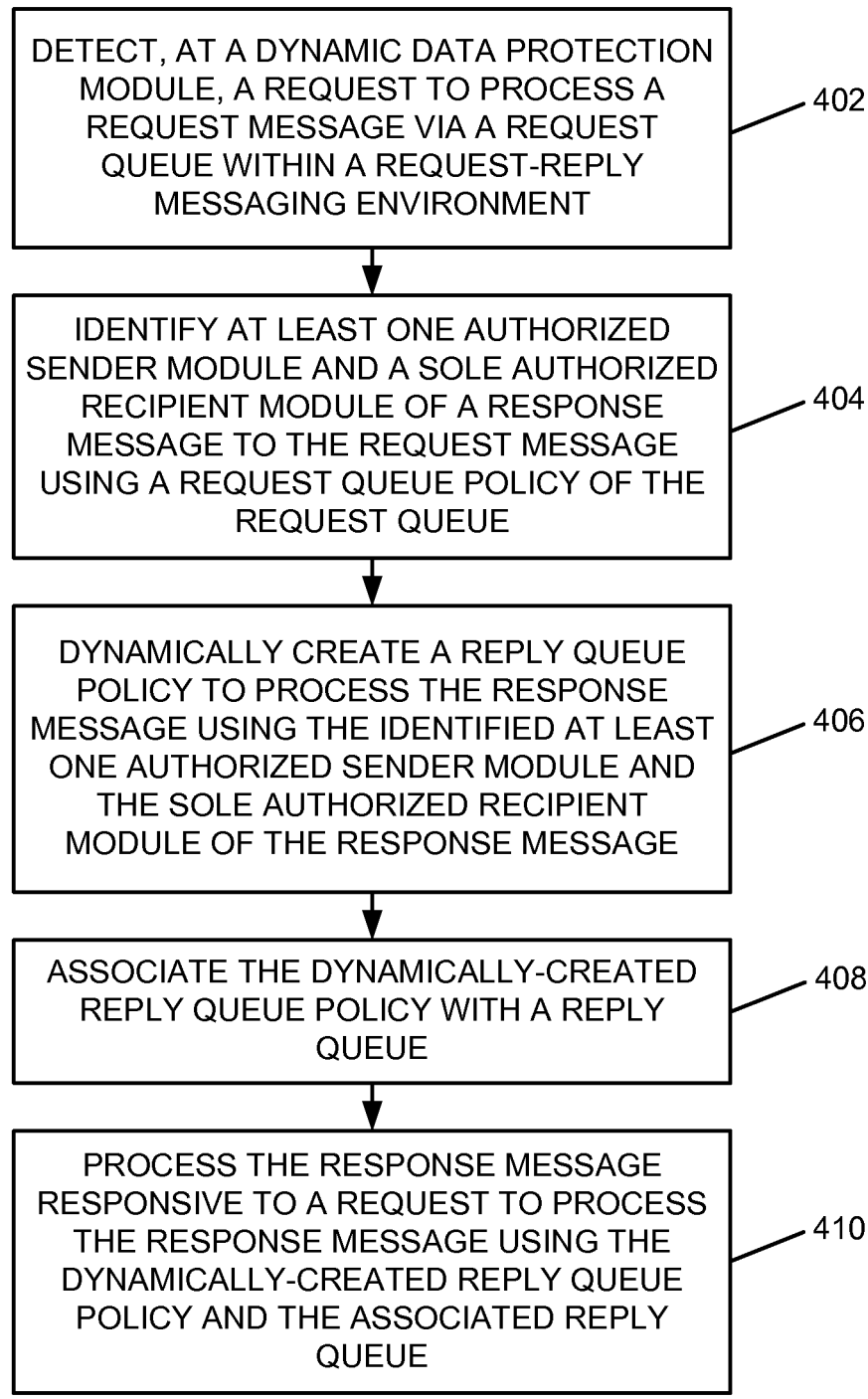
FIG. 4 is a flow chart of an example of an implementation of a process for automated dynamic data-protection policies within a request-reply message queuing environment according to an embodiment of the present subject matter.
Figure 5A:
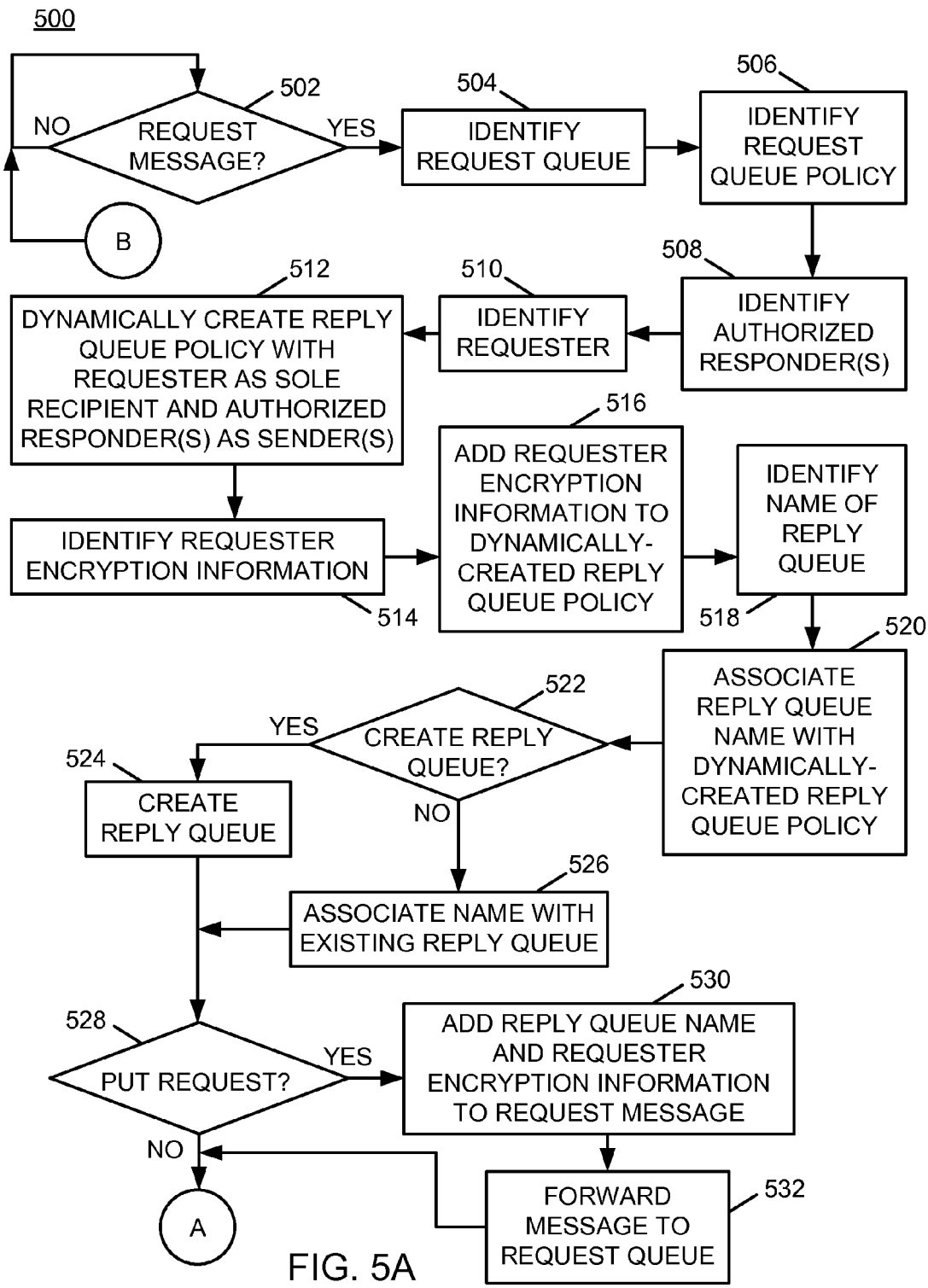
FIG. 5A is a flow chart of an example of an implementation of initial processing within a process for automated dynamic data-protection policies within a request-reply message queuing environment according to an embodiment of the present subject matter.
Figure 5B:
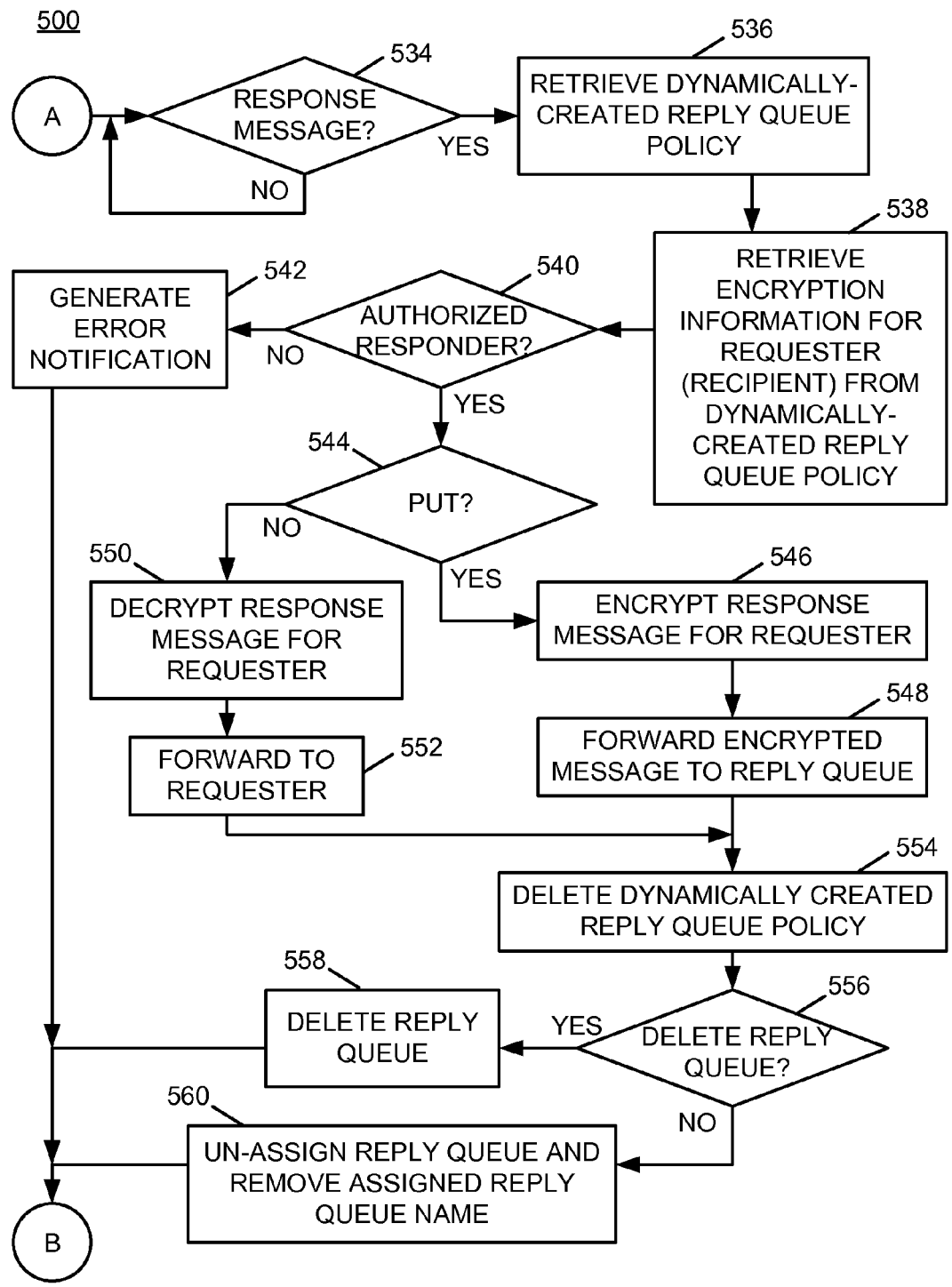
FIG. 5B is a flow chart of an example of an implementation of additional processing within a process for automated dynamic data-protection policies within a request-reply message queuing environment according to an embodiment of the present subject matter.

FIG. 4 through FIG. 5B below describe example processes that may be executed by devices, such as the core processing module 200, to perform the automated dynamic data-protection policies within a request-reply message queuing environment associated with the present subject matter. Many other variations on the example processes are possible and all are considered within the scope of the present subject matter. The example processes may be performed by modules, such as the dynamic data protection module 220 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter.

FIG. 4 is a flow chart of an example of an implementation of a process 400 for automated dynamic data-protection policies within a request-reply message queuing environment. At decision point 402, the process 400 detects, at a dynamic data protection module, a request to process a request message via a request queue within a request-reply messaging environment. At block 404, the process 400 identifies at least one authorized sender module and a sole authorized recipient module of a response message to the request message using a request queue policy of the request queue. At block 406, the process 400 dynamically creates a reply queue policy to process the response message using the identified at least one authorized sender module and the sole authorized recipient module of the response message. At block 408, the process 400 associates the dynamically-created reply queue policy with a reply queue. At block 410, the process 400 processes the response message responsive to a request to process the response message using the dynamically-created reply queue policy and the associated reply queue.

FIGS. 5A-5B illustrate a flow chart of an example of an implementation of process 500 for automated dynamic data-protection policies within a request-reply message queuing environment. FIG. 5A illustrates initial processing within the process 500. At decision point 502, the process 500 makes a determination as to whether a request to process a request message via a request queue within a request-reply messaging environment has been detected. As described above, a request to process a request message via a request queue may include a "PUT" request from a requester module that is generating a request or a "GET" request from a responder module that is responding to the request. As such, the processing described in association with FIG. 5A through 5B may be associated with a data protection module at either a requester or a responder, such as the dynamic data protection module 306 or the dynamic data protection module 308, described above in association with FIG. 3.

In response to determining that a request to process a request message via a request queue has been detected, the process 500 identifies the request queue associated with the request at block 504. It should be noted that the request message may include a request queue name or the data protection module may assign the request to a request queue as appropriate for a given implementation.

At block 506, the process 500 identifies a request queue policy associated with the identified request queue. At block 508, the process 500 identifies one or more responders within the request queue policy as authorized sender modules for a reply message. At block 510, the process 500 identifies the requester module of the request message as a sole authorized recipient module of a reply message to the request message, which may be performed either by analysis of the request message or the request queue policy. At block 512, the process 500 dynamically creates a reply queue policy to process a reply message using the identified at least one authorized sender module and the authorized sole recipient module of the reply message. As described above, the data protection module may swap the Recipient and Sender fields of the request queue policy to create the corresponding Sender and Recipient fields of the dynamically-created reply queue policy. The dynamic data protection module may assign the identified requester module as the sole authorized recipient module within a recipient data field of the dynamically-created reply queue policy and may assign the identified responder module(s) as authorized sender module(s) within a sender data field of the dynamically-created reply queue policy.

At block 514, the process 500 identifies requester module encryption information, such as an encryption key. It should be noted that where the processing is performed on a requester side of a message transaction, the dynamic data protection module may have access to the requester encryption information either within the request message itself or may have access to the requester encryption information separate from the request message itself. Alternatively, where the processing is performed on a responder side of a message transaction, the request message may be analyzed and the encryption information of the requester module may be included within the message payload. At block 516, the process 500 adds the requester encryption information to the responder-side Dynamic Reply Queue Policy 320. However, while the present example does not include adding the requester encryption information to the dynamically-created reply queue policy on the requester side of the messaging interaction, this should not be considered limiting as the requester-side Dynamic Reply Queue Policy 314 may alternatively be used to store the encryption information without departure from the scope of the present subject matter.

At block 518, the process 500 identifies the name of the intended reply queue for the response message. As with the description above, where the processing is performed on a requester side of a message transaction, the dynamic data protection module may autonomously create or select a name for the reply queue or the request message itself may include a name for the reply queue. Alternatively, where the processing is performed on a responder side of a message transaction, the request message may be analyzed and the name for the intended reply queue may be included within the message itself. At block 520, the process 500 associates the intended reply queue name with the dynamically-created reply queue policy.

At decision point 522, the process 500 makes a determination as to whether to create the reply queue. As described above, the reply queue may be created during run time or may be selected from a pool of available reply queues and dynamically named to form the association with the reply message. As such, in response to determining to create the reply queue, the process 500 creates the reply queue at block 524. It should be noted that creating the reply queue may include creating the reply queue to process the reply message using the dynamically-created reply queue policy. In response to determining not to create the reply queue, the process 500 associates the intended reply queue name with an existing reply queue at block 526. It should be noted that while the present example is intended to describe a variety of process implementations, as a practical matter, for implementations where a reply queue is created, it may be created on the requester side to expedite processing of response messages because after the requester "puts" the request message, it may likely immediately try to "get" the response from the reply queue. Additionally, as described above, to improve run-time efficiency a requester module may request the queue manager to create the reply queue before it puts the request message, and the request message may include the name of the reply queue as a data field. As such, the placement of the reply queue creation within the present example process 500 is for purposes of illustration and not limitation as to the sequence of processing. Many variations on the processing described in association with the process 500 are possible and all are considered within the scope of the present subject matter.

At decision point 528, the process 500 makes a determination as to whether the request to process the request message is a "PUT" request from a requester module or a "GET" request from a responder module. In response to determining that the request is a "PUT" request, the process 500 adds the reply queue name and the requester encryption information (e.g., the encryption key) to the request message at block 530. At block 532, the process 500 forwards the request message to the request queue. As described above, forwarding the request message to the request queue may include forwarding the request message to a queue manager module. Alternatively, where the queue manager module is integrated with the dynamic data protection module, the dynamic data protection module may place the request message directly on the request queue.

In response to forwarding the request message to the request queue at block 532, or in response to making a determination at decision point 528 that the request to process the request message is not a "PUT" request from a requester module (i.e., the request message is a "GET" request from a responder module), the process 500 transitions to the processing shown and described in association with FIG. 5B.

FIG. 5B illustrates additional processing associated with the process 500 for automated dynamic data-protection policies within a request-reply message queuing environment. At decision point 534, the process 500 makes a determination as to whether a request to process a response message has been detected. As with the request message described above, the request to process the response message may be received from either the responder module generating a "PUT" request to the reply queue or the requester module generating a "GET" request from a requester module to retrieve a message from the reply queue.

It should be noted that multiple request/response messaging interactions may be concurrently managed by the dynamic data-protection module. Processing to identify the respective reply queue associated with the request to process the response message has been omitted to reduce crowding within the drawing figure. However, it is understood that, in association with implementation in a multiple request/response messaging interaction environment, such processing may be performed without departure from the scope of the present subject matter.

In response to determining at decision point 534 that a request to process a response message has been detected, the process 500 retrieves the dynamically-created reply queue policy for the respective response message at block 536. At block 538, the process 500 retrieves the encryption information for the original requester module (i.e., recipient). For example, on the responder side of the messaging interaction, the dynamic data protection module 308 may extract the encryption information (e.g., encryption key) from the dynamically-created reply queue policy 320. Alternatively, on the requester side of the messaging interaction, the dynamic data protection module 306 may have access to the requester encryption information as part of its configuration.

At decision point 540, the process 500 makes a determination as to whether the responder is an authorized responder as represented within an authorized sender data field of the dynamically-created reply queue policy. As such, regardless of whether the process 500 is implemented at a responder side or a requester side of a messaging interaction, the process 500 verifies that the responder module associated with the response message is an authorized responder module using the dynamically-created reply queue policy.

In response to determining that the responder module is not an authorized responder module per the dynamically-created reply queue policy, the process 500 generates an error notification at block 542, such as by an error notification message to the responder module that is not authorized, to an administrator, to an error logging system, or otherwise as appropriate for a given implementation. The process 500 returns to the processing described above in association with FIG. 5A at decision point 502 and iterates as described above.

Returning to the description of decision point 540, in response to determining that the responder module is an authorized responder module per the dynamically-created reply queue policy, the process 500 makes a determination as to whether the request to process the response message is a "PUT" request from a responder module or a "GET" request from a requester module at decision point 544. In response to determining that the request comprises a "PUT" request from an authorized responder module, the process 500 encrypts the response message for the original requester module using the encryption information (e.g., encryption key) of the requester module obtained from the dynamically-created reply queue policy at block 546.

At block 548, the process 500 forwards the encrypted response message to the reply queue. As described above, forwarding the response message to the reply queue may include forwarding the response message to a queue manager module. Alternatively, where the queue manager module is integrated with the dynamic data protection module, the dynamic data protection module may place the response message directly on the reply queue.

Returning to the description of decision point 544, in response to determining that the request comprises a "GET" request from the original requester module, the process 500 decrypts the response message for the original requester module using the encryption information (e.g., encryption key) of the requester module obtained from the dynamically-created reply queue policy at block 550, or from an associated configuration external to the dynamically-created reply queue policy. At block 552, the process 500 forwards the decrypted response message to the original requester module.

In response to forwarding the decrypted response message to the original requester module at block 552, or in response to forwarding the response message to the reply queue at block 548, the process 500 deletes the dynamically-created reply queue policy at block 554. As such, the dynamically-created reply queue policy does not consume memory or storage space in response to completion of processing for the respective request message. Alternatively, if it is determined that the dynamically-created reply queue policy may be used for a further iteration (e.g., subsequent messaging), the dynamically-created reply queue policy may not be deleted during the current iteration, or if assigned from a pool of queues, may not be unassigned during the current iteration, and may be preserved for use during one or more subsequent iterations. It should be noted that the requester module may notify the queue manager that it no longer needs the reply queue. The respective dynamic data protection module may intercept this notification and perform a cleanup operation to delete the dynamically-created reply queue policy at that time. As such, the dynamically-created reply queue policy and the respective reply queue may be used for multiple requests and replies, as appropriate for the given implementation.

At decision point 556, the process 500 makes a determination as to whether to delete the reply queue. As described above, the reply queue may be dynamically-created along with the dynamically-created reply queue policy or may be assigned to the particular messaging interaction from a pool or other collection of available unassigned messaging queues. As such, in response to determining to delete the reply queue, the process 500 deletes the reply queue at block 558. Alternatively, in response to determining not to delete the reply queue, the process 500 un-assigns the reply queue from the respective messaging interaction and removes the assigned reply queue name from the reply queue at block 560, and as such, returns the respective queue to the pool of available queues. Alternatively, if it is determined that the dynamically-created reply queue may be used for a further iteration (e.g., subsequent messaging), the dynamically-created reply queue policy may not be deleted during the current iteration, or if assigned from a pool of queues, may not be unassigned during the current iteration, and may be preserved for use during one or more subsequent iterations.

In response to un-assigning the reply queue from the respective messaging interaction and removing the assigned reply queue name from the reply queue at block 560, or in response to deleting the reply queue at block 558, the process 500 returns to the processing described above in association with FIG. 5A at decision point 502 and iterates as described above.

As such, the process 500 provides for dynamic creation of dynamic reply queue policies and either creation or assignment of reply queues in response to requests to process a request message from either a requester module for request-side processing or a responder module for response-side processing. The dynamically-created reply queue policy is used to process and verify authenticity of responding modules. The response message is encrypted for the specific requester module using the requester encryption information from the dynamically-created reply queue policy and is forwarded to the reply queue for response-side processing. The response message is decrypted for the specific requester module using the requester encryption information from the dynamically-created reply queue policy, or from an associated configuration external to the dynamically-created reply queue policy, and is forwarded to the requester module for request-side processing. The dynamically-created reply queue policy is deleted if not reused. The reply queue is either deleted in response to completion of response message processing or the reply queue may be returned to a pool of available message queues. Alternatively, both the dynamically-created reply queue policy and the reply queue may not be deleted or unassigned where a further iteration of the request/reply cycle is identified.

As described above in association with FIG. 1 through FIG. 5B, the example systems and processes provide automated dynamic data-protection policies within a request-reply message queuing environment. Many other variations and additional activities associated with automated dynamic data-protection policies within a request-reply message queuing environment are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   detecting, at a dynamic data protection module, a request to process a request message via a request queue within a request-reply messaging environment;
   identifying at least one authorized sender module and a sole authorized recipient module of a response message to the request message using a request queue policy of the request queue;
   dynamically creating a reply queue policy to process the response message using the identified at least one authorized sender module and the sole authorized recipient module of the response message;
   associating the dynamically-created reply queue policy with a reply queue; and
   processing the response message responsive to a request to process the response message using the dynamically-created reply queue policy and the associated reply queue.

2. The method of claim 1, further comprising deleting the dynamically-created reply queue policy in response to completion of processing the response message.

3. The method of claim 1, where associating the dynamically-created reply queue policy with the reply queue comprises one of:
   creating the reply queue to process the response message using the dynamically-created reply queue policy; and
   assigning the reply queue from a pool of available reply queues to process the response message using the dynamically-created reply queue policy.

4. The method of claim 3, further comprising, in response to determining that messaging using the dynamically-created reply queue policy has completed, one of:
   deleting the reply queue; and unassigning the reply queue assigned from the pool of available reply queues to process the response message using the dynamically-created reply queue policy.

5. The method of claim 1, where the request message comprises a name for the reply queue and further comprising:
naming the reply queue using the name within the request message; and
associating the reply queue name with the dynamically-created reply queue policy.

6. The method of claim 1, where dynamically creating the reply queue policy to process the response message using the identified at least one authorized sender module and the sole authorized recipient module of the response message comprises:
identifying a requester module within a sender data field and at least one responder module within a recipient data field of the request queue policy;
assigning the identified requester module as the sole authorized recipient module within a recipient data field of the dynamically-created reply queue policy; and
assigning the at least one responder module as the at least one authorized sender module within a sender data field of the dynamically-created reply queue policy.

7. The method of claim 1, where dynamically creating the reply queue policy to process the response message using the identified at least one authorized sender module and the sole authorized recipient module of the response message comprises:
extracting requester encryption information from the request message; and
adding the requester encryption information to the dynamically-created reply queue policy.

8. The method of claim 7, further comprising verifying that a responder module associated with the response message is one of the at least one authorized sender module using the dynamically-created reply queue policy; and
where:
responsive to determining that the request to process the response message comprises a PUT message request from the responder module, processing the response message responsive to the request to process the response message using the dynamically-created reply queue policy and the associated reply queue comprises:
encrypting the response message using the requester encryption information from the dynamically-created reply queue policy; and
forwarding the encrypted response message to the reply queue; and
responsive to determining that the request to process the response message comprises a GET message request from the requester module, processing the response message responsive to the request to process the response message using the dynamically-created reply queue policy and the associated reply queue comprises:
decrypting the response message using the requester encryption information obtained from one of the dynamically-created reply queue policy and an associated configuration external to the dynamically-created reply queue policy; and
forwarding the decrypted response message to the requester module.

* * * * *